S. B. GRAY, DEC'D.
B. S. GRAY, EXECUTOR.
MOTOR VEHICLE.
APPLICATION FILED SEPT. 25, 1906.

1,012,841.

Patented Dec. 26, 1911.

UNITED STATES PATENT OFFICE.

STEPHEN B. GRAY, OF JACKSONVILLE, ILLINOIS; BARTLETT S. GRAY EXECUTOR OF SAID STEPHEN B. GRAY, DECEASED.

MOTOR-VEHICLE.

1,012,841.   Specification of Letters Patent.   Patented Dec. 26, 1911.

Application filed September 25, 1906. Serial No. 336,172.

*To all whom it may concern:*

Be it known that I, STEPHEN B. GRAY, a resident of Jacksonville, in the county of Morgan and State of Illinois, have invented certain new and useful Improvements in Motor-Vehicles, of which the following is a full, clear, and exact description.

The invention relates to power-driven vehicles such as automobiles or traction engines and more particularly to the driving mechanism whereby power is transmitted from the motor to the traction wheels and to the steering mechanism for determining the direction of travel of the vehicle. In practice it has been found desirable to drive all of the wheels of the vehicle i. e., to make all of them traction-wheels. When all of the wheels are positively driven it becomes possible to drive the wheels so the vehicle will be steered in the customary way i. e., so the rear wheels will follow substantially in the curvilinear path of the front wheels and also to manipulate the vehicle so that both the rear and front wheels may be operated or swung to sheer or direct the vehicle bodily to one side or the other as desired by turning all of the wheels in the same direction. The latter method of steering is frequently desirable where there is insufficient room for the vehicle to make a long turn, *e. g.* in driving the vehicle up to a curb or in any other instance where a sharp and bodily lateral movement is necessary to avoid accident. Oftentimes in passing a vehicle on a narrow road it is advantageous to drive the vehicle to one side of the road in as short a space as possible, and in other instances turning and reversing or backing the vehicle are necessary to bring it into the desired place.

One feature of the invention designs to provide an improved motor-vehicle embodying steering-mechanism by which all of the wheels may be simultaneously swung in parallel relation to facilitate dirigibility of the vehicle.

Another object of the invention is to provide an improved mechanism in which both the rear and front wheels are dirigible and positively driven and are all capable of being operated in the same direction to direct the vehicle laterally in the desired direction.

Another important object of the invention is to provide a motor-vehicle with mechanism which makes it possible to positively drive all of the wheels without variation of their relative speed in turning the vehicle from a straight course. In other words to make it possible to steer the vehicle and drive at traction-maintaining speed all of the wheels without variation of their relative speed.

Another object of the invention is to provide a steering mechanism whereby the rear and front wheels may be turned in opposite directions respectively to cause the vehicle to travel over a curved path and whereby they may also be shifted in the same direction to cause the vehicle to be directed bodily and laterally.

Another object of the invention is to provide an improved motor-wheel embodying steering-mechanism whereby all of the wheels can be shifted in the same direction and variable speed-mechanism.

Another object of the invention is to provide an improved vehicle embodying driving mechanism whereby the wheels of one side may be driven at differential relative speed with respect to those of the other side and which can also be operated to drive the wheels at the same speed when so desired in steering the vehicle.

The invention further designs to provide an improved construction for the dirigible wheels and driving-connection therefor.

The invention further designs to provide improved driving mechanism and steering mechanism for motor vehicles.

The invention consists in the several novel features hereinafter set forth and more particularly defined by claims at the conclusion hereof.

A denotes a supporting-frame which may be of any suitable construction, to which are rigidly secured a front axle or cross-bar A' and a rear axle or cross-bar A²; B, B', the front traction wheels, and C, C' the rear traction wheels. Each of the traction wheels is dirigible and journaled on a spindle or stub-axle 12 (see Figs. 2, 8, 9 and 10) which is provided with a recess 13 wherein is held the extended or flattened axle-terminal 14. A pintle 15 pivotally connects the spindle to the axle, so that the wheel and spindle can be turned horizontally. Spindle 12 and the hub 16 of the wheel, are respectively provided with bearing elements of any well known construction, which form a journal for the traction-wheel. A cap-nut 17 secures the hub of the wheel against outward movement on the spindle. A shoulder 18 on the spindle confines the hub against inward play and the hub is journaled on the spindle although it will be understood that any suitable and well known form of bearing may be employed. It will also be understood that the body of the wheel may be of any suitable construction, according to the uses for which the vehicle is designed. The terminal 14 of the axle is flattened and fits snugly in recess 13 of the stub axle and thereby the latter is held against rotation. The recess 13 and axle-terminal are formed to permit the spindle to be turned laterally with the wheel so the vehicle can be steered. Each of the spindles has secured thereto an arm 19 which is connected to the steering mechanism as hereinafter described. As a result of this construction the pivot-point or spindle, about which the wheel is turned, is brought substantially into alinement with the vertical center of the wheel so that the wheel can be turned with ease, because the lateral displacement at the point of traction is very slight. Thus, it will be seen, that the swivel connection for the wheel is simple in construction and the wheels can be easily and readily operated when necessary in steering the vehicle.

Figure 3:
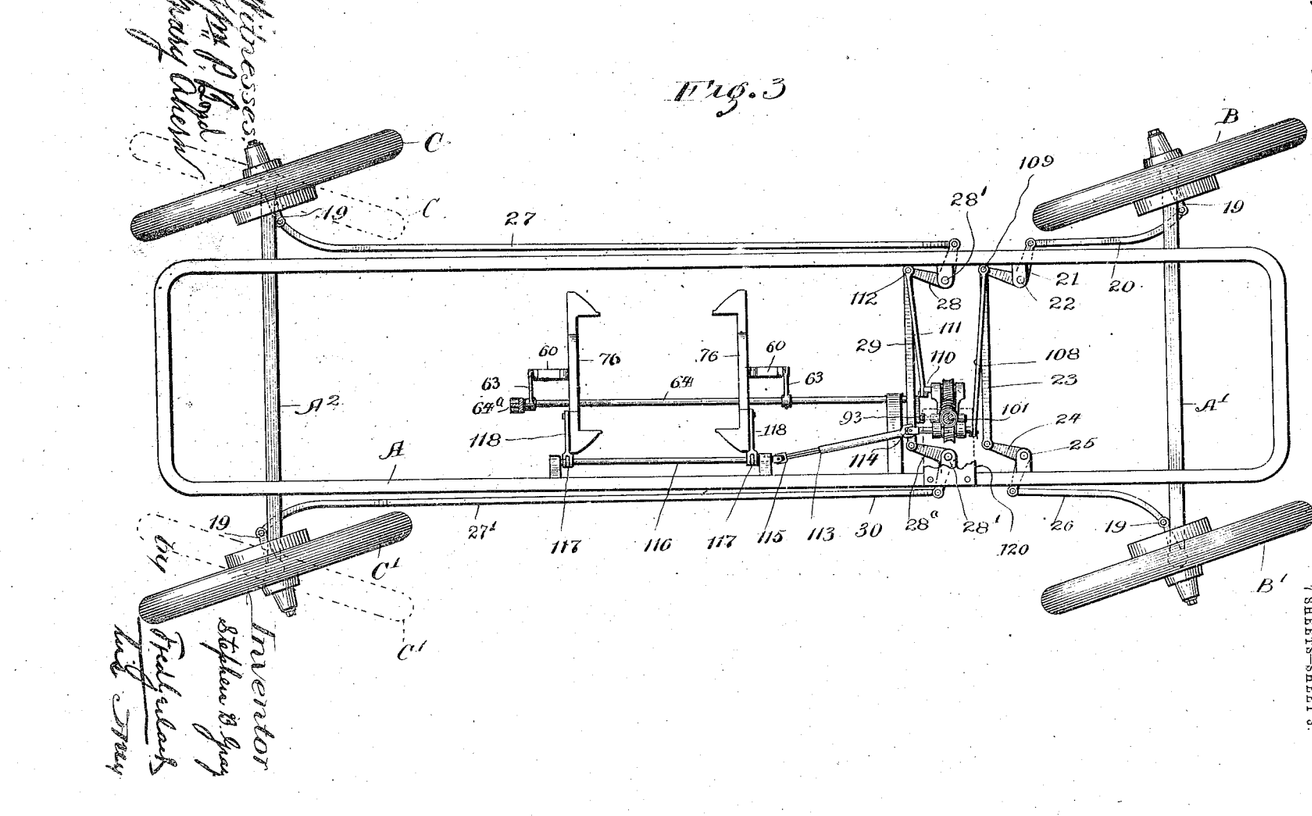
Fig. 3 is a skeleton plan showing all of the wheels turned in the same direction, the driving mechanism being omitted.

The front wheels B, B' (see Figs. 1, 2 and 3) are connected together for conjoint lateral movement by a cross-connection comprising a link 20 (see Figs. 2 and 3) the front end of which is pivotally connected to an arm 19 of the spindle of wheel B' and the other end of said link is connected to a bell-crank lever 21 which is pivotally connected to the frame as at 22, a cross-connector or link 23 connected to one arm of lever 21 and to an oppositely arranged bell-crank lever 24 which is pivotally sustained as at 25 and a link 26 pivotally connected to the other arm of lever 24 and which has its front end pivotally connected to the arm 19 of the spindle of wheel B'. By means of this connection the front wheels are always shifted in parallel relation with respect to each other. The rear wheels C and C' are similarly connected for conjoint parallel shift by a link 27 having its rear end pivotally connected to the arm 19 of the spindle of wheel C, and a bell-crank lever 28 pivoted as at 28' to the frame. The front end of link 27 is connected to one arm of said lever and a cross connector 29 is pivotally connected to the other arm of said lever. A bell-crank lever 28ᵃ to which the other end of connector 29 is connected, is pivoted as at 28' to the frame, and a link 27' is pivotally connected at its front end to the other arm of said bell-crank lever 28ᵃ has its rear end connected to the arm 19 of the spindle of traction wheel C'. This cross-connection serves to turn the rear wheels in parallel relation under control of the mechanism hereinafter described.

A driving-connection (see Figs. 8, 9 and 10) is provided for each of the traction-wheels, which permits them to be shifted laterally about the pivotal connections between the wheels and the fixed axle or frame. Each of said driving-connections comprises a gear-wheel 30 provided with internal teeth, a pinion 31 journaled on a stud or trunnion secured to spindle 12, a pinion 32 secured to a short shaft 33 which is journaled in a bearing 34 on the axle A, and a shaft 35 formed of telescopic sections slidably connected to each other and respectively connected by a universal joint 36 to pinion 31 which moves with the spindle and by a universal joint 37 to shaft 33. This construction provides a connection between the pinion 32 or driving element which is mounted on the frame and the laterally movable pinion 31 which is at all times retained in engagement with gear wheel 30 of the traction wheel. The flexible connection between said pinions permits the traction wheel to be swung about the pivotal connection between the axle and the wheel without disturbing the driving relation of the connection. This gearing and flexible connection provides a driving connection for the traction wheels which permits each to be turned about its pivot to drive the vehicle in the desired course and which is simple in construction.

Variable drive mechanism is provided for respectively driving the vehicle and for driving the wheels at one side at differential speed with respect to those at the other side in turning the vehicle and for positively driving each of them at traction-maintaining speed, and for conjointly varying the speed of all of the traction wheels of the vehicle. This mechanism is also constructed so that when all of the traction wheels are turned in the same direction to cause the vehicle to move bodily and quickly to either side, all of the wheels will be driven at the same speed as well as providing for differential driving when the vehicle is turned so the rear wheels will follow in the path of the front wheel.

The variable drive mechanism (see Figs. 1, 2, 7, 11 and 12) comprises an adjustable pulley E and a pair of adjustable pulleys F, F', all of which are operatively connected by a belt G. Belt G extends around the adjustable rims of pulley sections E, F and F', and around a pair of adjustable guide or idler-pulleys 40 mounted in brackets 40$^a$ secured to the main-frame. Pulleys E, F and F' are conjointly adjustable to drive the connections of the traction-wheels at different and graduated speeds from the primary driving shaft or motor (not shown). Pulleys F and F' can be adjusted to vary their relative speed to drive the traction wheels at one side of the vehicle at different speed with respect to the traction-wheels at the other side. The wheel F is connected to positively drive the wheels at one side and the adjustable pulley F' is connected to positively drive the traction-wheels at the other side of the vehicle. Resultantly, the speed at which the vehicle travels may be varied as desired and the relative speed of the traction-wheels can be varied to positively drive all of them when the vehicle is driven around a turn or corner.

Each of the adjustable pulleys, (see Figs. 11 and 12) comprises a pair of sides 41 longitudinally movable with respect to each other on a shaft and having oppositely arranged inclined guide bars 42 to which rim-sections 43 are slidably connected by boxes 44. By relative longitudinal movement of the pulley-sides the adjustable rim-sections may be shifted radially and positively inwardly or outwardly to vary the diameter of the rim, thus adjusting the size of the pulley. Each pulley-side 41 is provided with a hub 42$^a$ and a non-revolubly held collar 45 to hold the pulley sides in assigned position longitudinally and against outward movement. A suitable ball-bearing 46 (see Fig. 12) is interposed between collar 45 and the hub 42$^a$ of each pulley-side. When the collars 45 are adjusted longitudinally by mechanism hereinafter described, the pulley-sides are correspondingly shifted to adjust the rim-sections inwardly or outwardly. Each collar 45 is provided with rollers or studs 46 with which engages a controller or shifter for the pulley. Each pulley is connected to its shaft by a key and groove 42$^1$ so the pulley and shaft revolve together.

The main driving pulley E is mounted on a main-driving shaft 48 being connected thereto by a key and groove 42' so as to be driven thereby. Shaft 48 is usually provided with a reversing gear and clutch (not shown) driven by the motor. This shaft is journaled in bearings 49 secured to frame A and may be operatively connected to the motor in any suitable or usual manner. Pulley F is mounted on and operatively connected by key and groove 42' to a shaft 50, which is mounted in bearings 51 secured to the vehicle frame. The front end of shaft 50 is operatively connected (Figs. 1 and 2) to gear 32 for traction-wheel B, by universal joints 52 and 54, shaft 53 and gear 47 to provide a driving connection for the said traction-wheel and the rear end of said shaft is connected to gear 32 for traction-wheel C by universal joint 55, 57, shaft 56 and gear 58 to provide driving-connection for the rear-traction wheel C. Thus the shaft, driven by the pulley F is connected to the front and rear wheels at the one side of the vehicle. Pulley F' is mounted on and operatively connected to a shaft 50', which is mounted in bearings 51' secured to the main frame and has its front and rear ends respectively connected to the traction-wheels B' and C' by similar shaft, universal joint and gear connections, to operatively connect and positively drive the front and rear traction-wheels at the other side of the machine.

In turning a corner or controlling the course of the vehicle in the usual manner and so the rear wheels follow the path of the front wheels, the inner wheels travel over an arc of shorter radius than traveled by the outer wheels and must therefore be driven at a lower relative speed, if the traction of all the wheels is to be utilized. Resultantly, the relative speeds of pulleys F' and F' must be varied to positively drive the wheels at each side of the vehicle. When varying the speed of the vehicle the relative speed of pulleys F and F' is maintained but their speed with respect to the main driving pulley E is varied. In steering the vehicle the relative speed of the pulleys F and F' is varied to drive the traction-wheels according to the course in which the vehicle is traveling. When the vehicle is steered by swinging all of the wheels in the same direction the wheels are all driven at the same relative speed.

Figure 1:
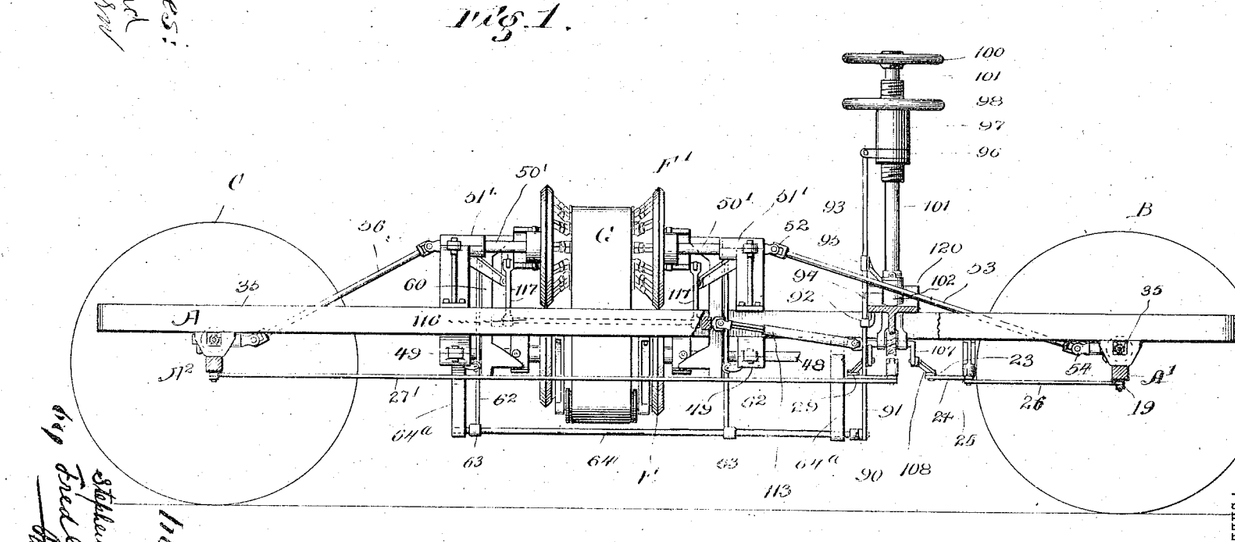
Figure 1 is a side elevation of a motor-vehicle embodying the invention.
Figure 2:
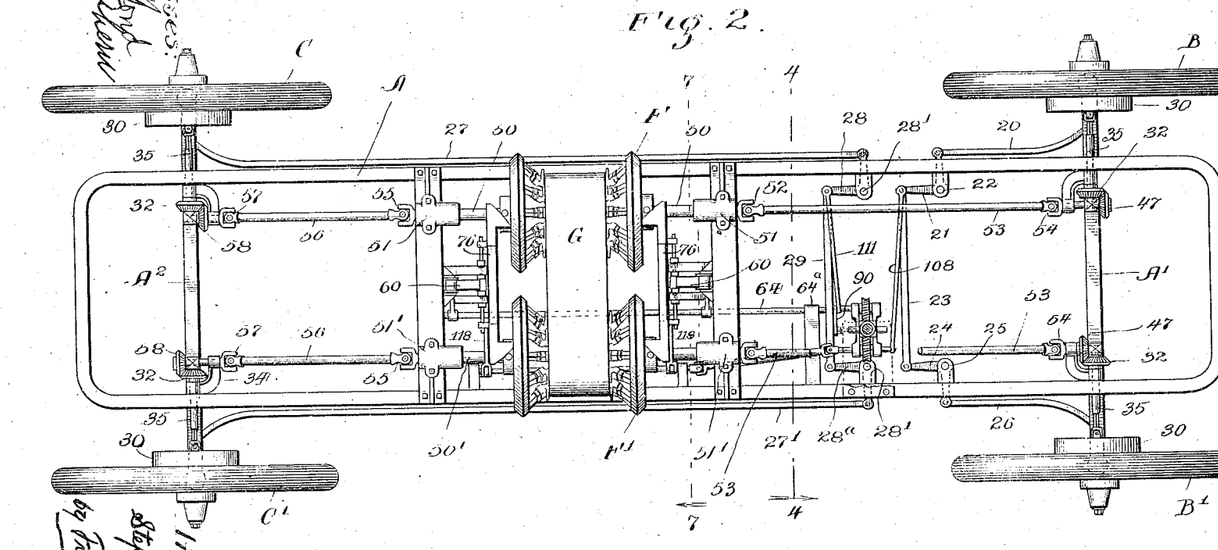
Fig. 2 is a plan, parts being omitted.

The size of the drive-pulley E is controlled by a pair of vertically slidable shifters 60 (Fig. 11) the lower ends of which are each provided with a cam surface 61 adapted to engage the rollers 46 of the adjusting-collars 45 at the opposite sides of pulley E. Each shifter 60 is connected by a link or bar 62 to an arm 63 secured to a rock-shaft 64. Said rock-shaft is supported from the frame by brackets 64$^a$ (Fig. 1). The pulleys F and F' which are driven by the belt G are conjointly adjusted with pulley E, i.. e., when the size of the pulley E is increased the size of pulleys F and F' are correspondingly decreased to retain the belt in operative connection with all of the pulleys. By this mechanism the size of pulley E can be adjusted to drive the vehicle at any desired speed within the limits of the adjustment of the pulleys. Each of the shifters 60 is guided vertically by rollers 67 and 68 and the upper end of each shifter is provided with a cam-surface 70 which engages a stud or roller 69 on an arm 71 which is secured to a rock-shaft 72, journaled in bearings sustained by the frame. Each rock-shaft 72 has rigidly secured thereto a pair of arms 74 (Fig. 12 and 13) the upper ends of which are pivotally connected by a stud and slot 75 to a slidable and laterally movable shifter
76. Each shifter is provided at one of its ends with cam-surfaces 77 in engagement with the studs of one of the adjusting collars 46 of pulley F and at its other end with cam-surfaces 78 in engagement with the adjusting studs of collar 45 of the pulley F'. Cams 77 and 78 when moved inwardly or outwardly adjust the pulleys F and F' simultaneously with the adjustment of pulley E and so that when the size of both pulleys F and F' will be proportionately varied so the belt will be retained in operation with respect to the pulleys and without variation of the relative speed of pulleys F, F'. To vary the speed of the vehicle, shifter 60 will be operated longitudinally by rock-shaft 64, arms 63 and links 62 to shift the adjusting-collars 45 of the pulley E and simultaneously cams 70 of shifters 60 will operate rollers 69, arms 71, rock-shafts 72, arms 74, stud and slot-connections 75, shifters 76, to conjointly shift the adjusting collars 45 of pulleys F, F' inwardly or outwardly to correspondingly vary the size of the pulleys F and F' with respect to pulley E.
The relative speed of pulleys F and F' is controlled by the steering mechanism and is variable to correspond to the direction in which the wheels travel; the degree of variation corresponding to the angle at which the traction-wheels are turned.

Figures 4, 5, 6:
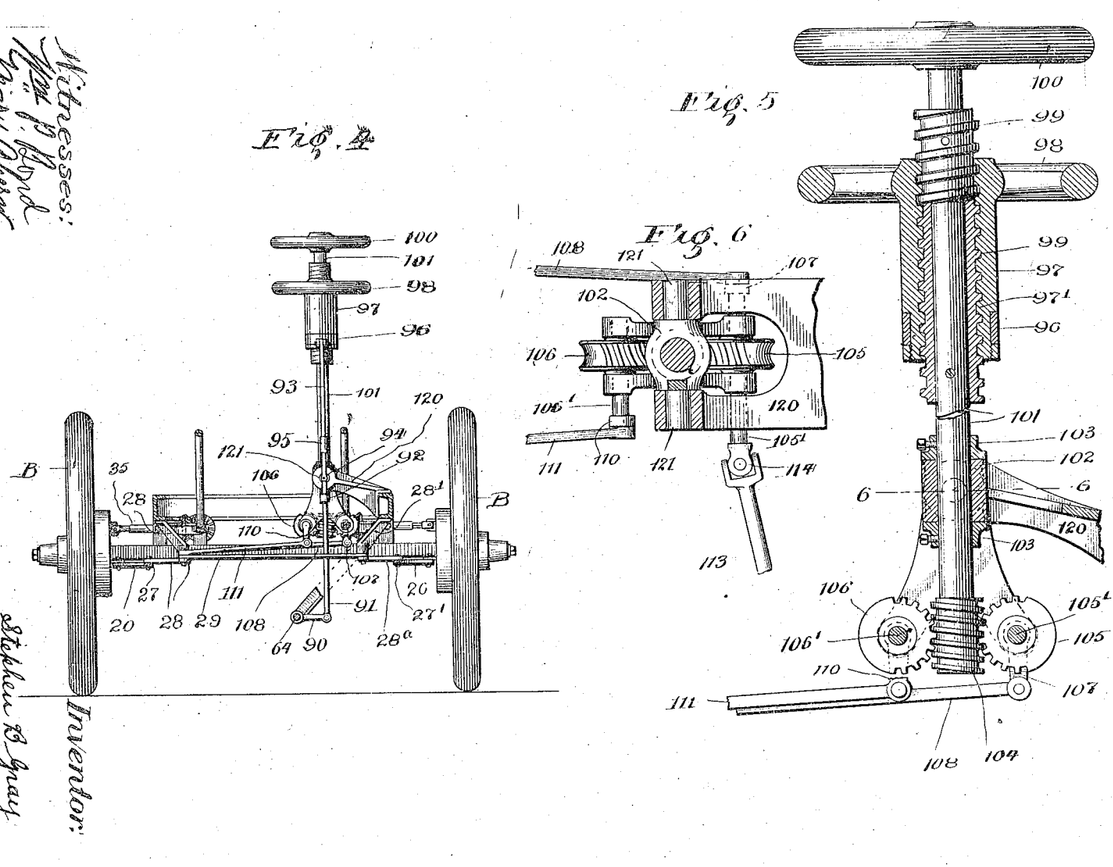
Fig. 4 is a section on line 4—4 of Fig. 2.
Fig. 5 is a detail partly in section and partly in elevation of the controlling mechanism.
Fig. 6 is a detail section on line 6—6 of Fig. 5.

The variable-speed driving mechanism is controlled by and connected to a hand-wheel 98 (Figs. 4, 5 and 6) whereby the operator can at will, control and vary the speed of the machine by adjustment of the variable drive mechanism. Hand wheel 98 is provided with a hub 97 which is provided with an internal screw-thread 99 on a steering-shaft 101 hereinafter more fully described.
Screw 99 and shaft 101 are secured against longitudinal movement and by relative rotation of hand-wheel 98 with respect to the steering shaft, hub 97 is moved longitudinally to operate a collar 96 which is held in a groove formed in said hub and in such manner that the hub of the hand-wheel can be rotated independently of the collar and so that longitudinal movement of the hand-wheel will shift said collar longitudinally (Fig. 4). Collar 96 is connected to the upper end of a rod 93 which has its lower end hinged as at 94 to a rod 91 which is pivotally connected to an arm 90 secured to the front end of rock-shaft 64 which operates the shifters for the adjustable pulleys. Rod 93 is guided in a bracket 95 and the lower rod 91 is guided in a fixed bracket 92. Hinge 94 is alined with a hinge-pivot for the steering-shaft for purposes presently set forth. When the speed of the vehicle is to be changed the operator will rotate hand-wheel or lever 98 around screw 99 of the steering shaft to impart longitudinal movement to the rods 93 and 91 which will oscillate the rock-shaft 64 and adjust the pulleys by the connections between said shaft and the shifters hereinbefore described. By the controlling mechanism described the size of the pulleys E, F, F' may be adjusted to drive the vehicle at any desired speed within the limits of the adjustment of said pulleys.

Steering mechanism is provided whereby all the wheels may be shifted in the same direction to cause both the front and rear wheels to travel likewise in the same direction and whereby the front and rear wheels may be swung in opposite directions to cause the vehicle to turn in such manner, that the rear wheels will substantially follow the path of the front wheels. The controlling mechanism for steering the vehicle is adapted to adjust the driving-mechanism to vary the relative speed of the wheels at one side with respect to those at the other side the degree of variation corresponding to the difference in the lengths of the paths of wheels over which the traction-wheels travel when they are turned to cause the rear wheels to follow in the path of the front wheels and thus each of the wheels will be positively driven at proper relative speed for efficient traction and in response to the controlling mechanism which conjointly controls the steering and driving mechanisms. When all of the traction wheels are turned in the same direction, the proper speed for efficient traction is obtained by driving all of the wheels at the same speed, because the paths are of equal length and the steering-mechanism is adapted to thus shift the wheels without varying the relative speed of the wheels. In operation the controlling mechanism conjointly controls the turning of the wheels and the relative speed of the wheels at one side with respect to those at the other when steering in one manner and when steering in the other manner, the steering mechanism is operated independently of the speed adjusting mechanism.

The steering-mechanism (Figs. 1, 3, 5 and

6) comprises a controller-wheel or other suitable lever 100 secured to steering-shaft 101 which is revolubly mounted in a journal bracket 102, being held against longitudinal play therein by collars 103. A screw 104 secured to the lower end of shaft 101 engages a pair of tooth-wheels or pinions 105 and 106 and rotates the shafts 105' and 106' of said pinions in opposite directions respectively, when the steering shaft is rotated. Pinion 105 operates a crank 107, which is connected by a link or bar 108 to the cross-connection for the front traction-wheels at 109. In like manner pinion 106 operates a crank 110 connected by a link 111 to the cross-connection for the rear traction-wheels as at 112. Pinion-shafts 105' and 106' are journaled in extensions of bracket 102 in which the steering-shaft is journaled and are thereby retained in operative relation with respect to the steering-shaft. Rotation of the steering-shaft operates pinions 105 and 106 in opposite directions and resultantly the front wheels will be turned thereby about their pivots 15 in one direction, while the rear wheels will be turned in opposite direction so that the rear wheels will substantially follow the paths of the front wheels. In this manner of steering vehicles the wheels at the one side of the vehicle will travel over a shorter course than the outer wheels and the purpose of varying the relative speed of the wheels at one side of the vehicle with respect to the wheels at the other side is to positively drive the several wheels at proper relative speed to maintain efficient traction.

Figure 7:
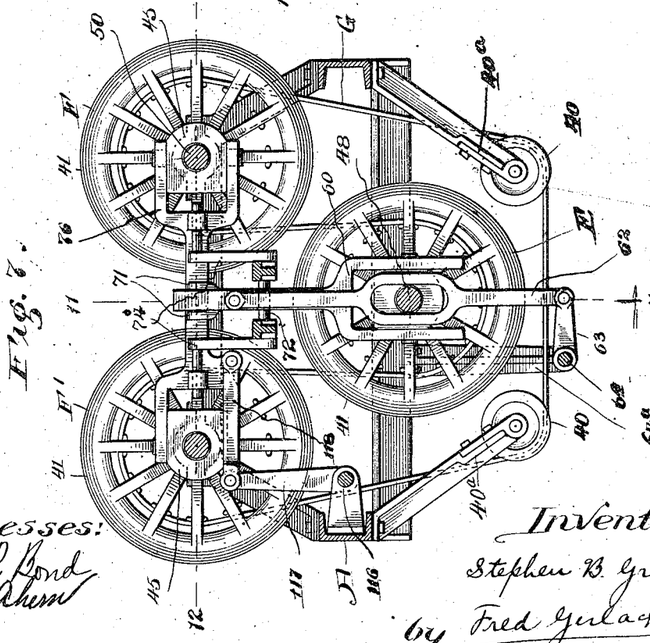
Fig. 7 is a section on line 7—7 of Fig. 2 on a somewhat larger scale.
Figure 8:
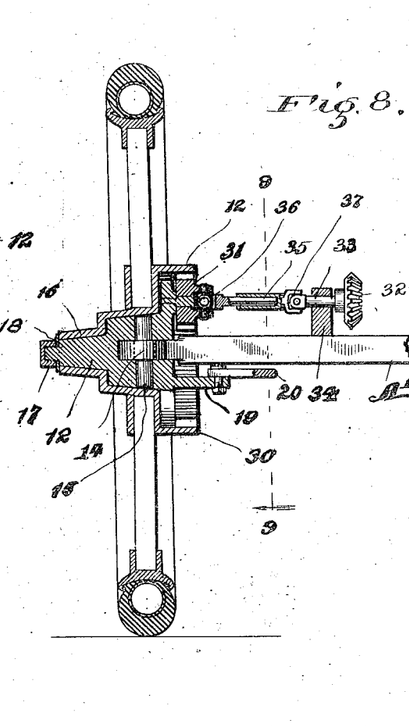
Fig. 8 is a section through one of the wheels showing the driving gear therefor.
Figures 9, 10, 11:
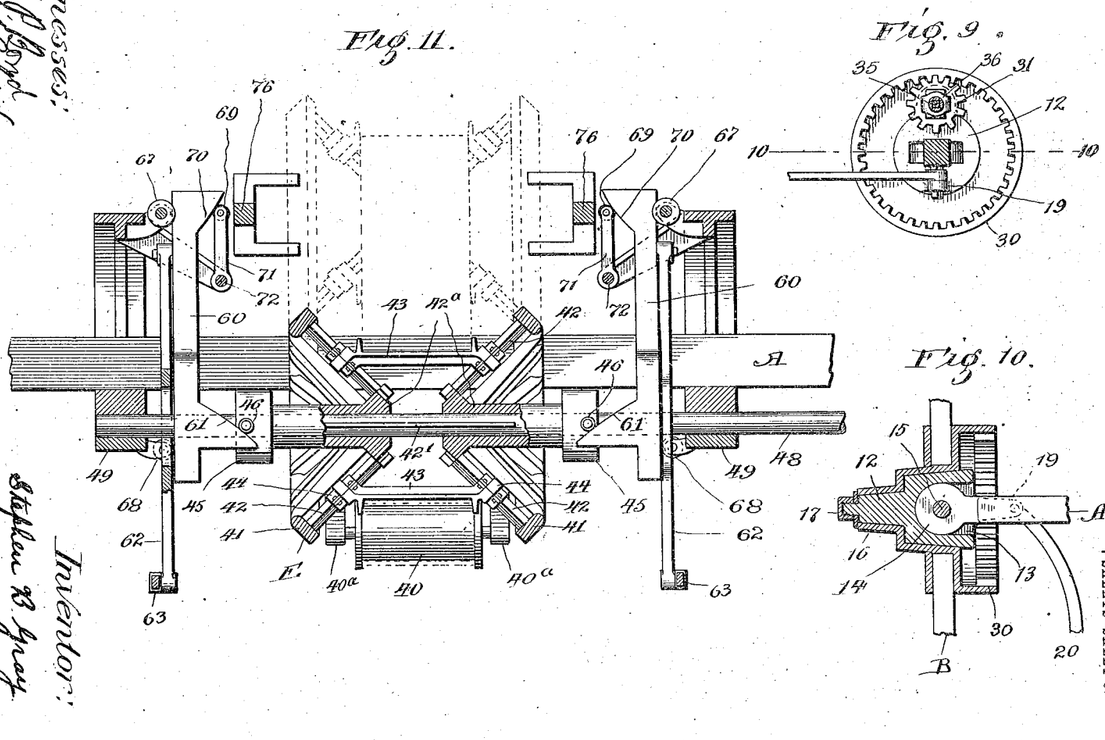
Fig. 9 is a detail, being a section on line 9—9 of Fig. 8.
Fig. 10 is a section on line 10—10 of Fig. 9.
Fig. 11 is a view in central longitudinal section on line 11—11 of Fig. 7.
Figures 12, 13:
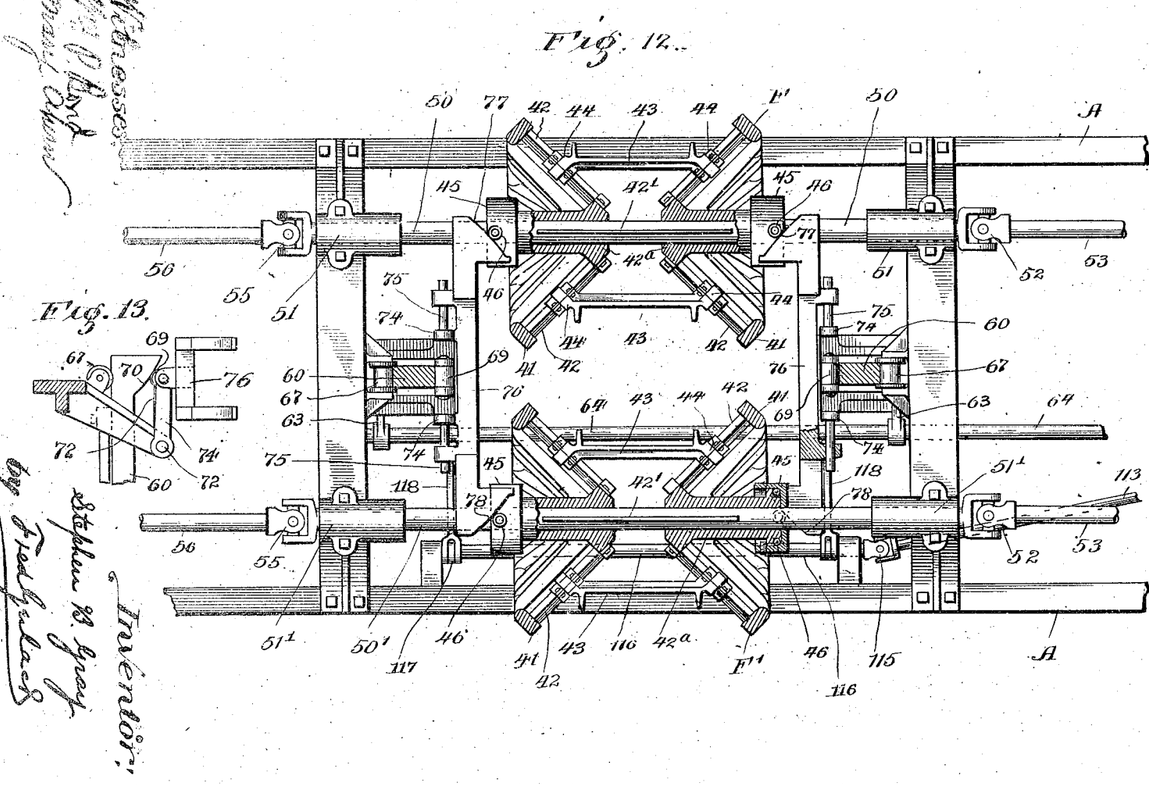
Fig. 12 is a horizontal section on line 12—12 of Fig. 7.
Fig. 13 is a detail view showing shifting devices.

Pulleys F and F' are conjointly and relatively variable, conjointly with the steering mechanism. To effect the relative adjustment of said pulleys, pinion-shaft 105' is connected (Figs. 1, 3 and 6) to the laterally movable shifters 76 by a flexible telescopic shaft 113, which is connected to shaft 105' by a universal joint 114 and to a rock-shaft 116 by a like joint 115. Said rock-shaft is connected to each of the shifters 76 by an arm 117 and link 118 (Fig. 7). By this mechanism shifters 76 may be adjusted so the pulleys F and F' will be driven at different speed and at the proper relative speed to drive the wheels at one side at proper speed with respect to those at the other when turning a corner. When the steering-wheel 100 is turned in one direction pinions 105 and 106 will be turned in opposite directions respectively. The cross-connections for the front wheels will swing them in one direction and the cross-connections for the rear wheels will be operated to turn them in reverse direction so that the rear wheels will be driven to follow in the paths of the front wheels. The driving mechanism will also respond to such operation of the steering-wheel to drive the wheels at one side at differential speed with respect to those at the other, so each traction-wheel will be positively driven at traction maintaining speed, because pinion-shaft 105' will turn shafts 113 and 116 and arms 117 to operate links 118 to move shifters 76 longitudinally to adjust pulleys F and F', so they will be driven at the proper relative speed. Said shifters are mounted to slide longitudinally the stud and slot connections 75 being formed to permit longitudinal movement of the shifters, independent of the shifters for main drive-pulley E by mechanism aforesaid and when operated by the steering-wheel will be adjusted so that the cams at one end thereof will shift and adjust collars 45 of one of the pulleys F, F' inwardly while the cams at the other end thereof will permit the belt G to adjust the other pulley outwardly, thus varying the relative sizes of said pulleys to compensate for the differences in the length of the course traveled by the wheels and so they will be positively driven at the proper speed. When thus differentially adjusted shaft 50 which drives the traction-wheels at one side of the vehicle will be driven at a different speed than the shaft 50' which drives the traction-wheels at the other side of the vehicle, this differentiation varying in degree to correspond to the differences of the curvilinear path lengths traversed by the wheels and the angle at which the traction-wheels are run. Thus the traction-wheels are positively driven in turning the vehicle and at different relative speeds to drive the vehicle without any slipping of the wheels over the ground when turning a corner.

One of the important features of the present invention consists in providing means whereby the vehicle may be caused to sheer laterally more readily and quickly than is possible when the more usual way of steering that is by causing the rear wheels to follow the paths of the front wheels is adapted. Inasmuch as all of the wheels are traction-wheels and are positively driven by the mechanism heretofore described, manifestly, by turning all of the wheels in the same direction, both the front and rear portions of the vehicle may be caused to travel laterally in quick response to the steering or controlling mechanism. For this reason mechanism is provided whereby the operator can readily swing the wheels in the same direction independently of the adjusting means for the driving mechanism when this method of steering is employed. Preferably although not necessarily this shift of all of the traction-wheels in the same direction is accomplished by differential operation of the controlling means employed for shifting the wheels at the front and rear in opposite directions respectively. Journal-bracket 102 (Figs. 1, 4 and 5) in which the steering-shaft is journaled is pivotally mounted in a fixed bracket 120, being connected thereto by trunnions 121. This construction permits the steering-shaft and controller 100 to be tilted laterally in either direction and thereby cranks 110 and 107 may be shifted laterally and bodily to operate the cross-connections for the front and rear wheels, so all of the wheels will be turned in the same direction as clearly shown in Fig. 3 of the drawings. The flexible telescopic shaft 113 permits tilting of the steering-shaft and its connected parts without turning shaft 116 which controls adjustment of the driving mechanism. The connection for the speed-varying mechanism comprise rods 93 and 91 connected by a joint 94 substantially concentric with the pivotal connection between journal-bracket 102 and the frame bracket 120 so that lateral tilting of the steering-shaft and the controller will not disturb connection for controlling the mechanism. By tilting the steering-lever and shaft 101 to one side or to the other all of the traction-wheels will, quickly in response thereto, be swung in the same direction to cause the vehicle to sheer laterally and more quickly than is possible when the rear wheels are swung to follow in the paths of the front wheels.

The operation of the improved mechanism will be as follows. Assuming the driving mechanism to be in the position shown in Fig. 2 and shaft 48 to be driven by a motor all of the traction-wheels will be driven by power communicated from shaft 48 to pulley E and from said pulley by belt G to pulleys F and F' which will be in position to drive shafts 50 and 51 at the same relative speed, which will, by means of shafts 53 and 56 and the driving-connections at each of the wheels, drive all of the traction-wheels at the same speed, whereupon the vehicle will travel forwardly in straight direction. If the operator desires to decrease or increase the speed of the vehicle he will operate controller-wheel accordingly shift the connection including collar 96, rods 93, 91, arm 90 and shaft 64 and arms 63 to operate shifters 60 so the cams 61 will adjust the adjusting-collars 45 of pulley E. Cams 70 of shifters 60 will simultaneously operate arms 71, rock-shafts 73, arms 74 and connections 75 to operate shifters 76 which controls the adjustment of pulleys F and F'. Said pulleys will be adjusted equidistantly and conjointly to such extent that the belt will be retained in operative relation with all of the pulleys, i. e., if the size of pulley F will be decreased and vice versa. Therefore, by operation of controller 98 the driving mechanism can be gradually adjusted to drive the vehicle at any desired speed. To steer the vehicle the operator may turn controller 100 to operate the cross-connections for the front and rear traction-wheels in opposite directions respectively, by means of screw 104, pinions 105, 106, cranks 107, 110 and links 108 and 111. The front and rear traction-wheels may be swung thereby, in opposite directions respectively, the wheels of the front being shifted in substantial parallel direction and the rear wheels resulting from rotation of the controller 100 is such as to cause the rear wheels to travel over the same path as the front wheels. This operation of the controller 100 also effects adjustment of the driving mechanism to differentially drive the traction-wheels at one side with respect to those on the other side to correspond to the curved paths in which they travel respectively, by means of shafts 113, 116, cranks 117 and links 118 which operate shifters 76 longitudinally so the cams at their ends will increase the size of one of the pulleys F, F' and correspondingly decrease the size of the other pulley. Then each traction-wheel will be positively driven at the proper relative speed to cause the vehicle to travel in the course desired and according to the direction of the traction-wheels determined by the steering-mechanism.

When it is desired to cause the vehicle to sheer laterally, it is only necessary for the operator to tilt the steering-wheel about its pivots 121, so cranks 107, 110 and links 108 and 111 which will shift said cranks bodily and operate the cross-connections of the front and rear traction-wheels, so they will be swung in parallel relation with each other and in the same direction. Such operation will not adjust the differential driving-mechanism and result in driving all of the traction-wheels at the same speed, the telescopic-shaft 113 permitting such independent operation without turning shaft 116.

The invention is not to be understood as restricted to the construction shown and described since these may be varied without departing from the spirit and scope of the invention.

Having thus described the invention, what I claim as new and desire to secure by Letters Patent, is:

1. In a motor-vehicle, the combination of a pair of front and a pair of rear dirigible traction-wheels, driving mechanism, a driving connection for each of said wheels, means for swinging all of the wheels in the same direction, means for swinging one of said pairs of wheels differentially with respect to the other pair and means for driving the wheels at one side at different speed with respect to the wheels at the other side.

2. In a motor-vehicle, the combination of a pair of front and a pair of rear dirigible traction-wheels, variable-speed driving mechanism, a driving-connection for each of said wheels, means for swinging all of the wheels in the same direction, means for swinging one of said pairs differentially with respect to the other pair and means for driving the wheels at the one side at different speed with respect to the wheels at the other side.

3. In a motor-vehicle, the combination of a pair of front and a pair of rear dirigible traction-wheels, driving mechanism, a driving connection for each of said wheels, means for swinging all of the wheels in the same direction, means for conjointly swinging the front and rear wheels in opposite directions respectively and means for driving the wheels at one side at different speed with respect to those at the other.

4. In a motor-vehicle, the combination of a pair of front and a pair of rear dirigible traction-wheels, variable-speed driving mechanism, a driving connection for each of said wheels, means for swinging all of the wheels in the same direction, means for conjointly swinging the front and rear wheels in opposite directions respectively and means for driving the wheels at one side at different speed with respect to those at the other.

5. In a motor-vehicle, the combination of a pair of front and a pair of rear dirigible traction-wheels, mechanism for driving all of said wheels, controlling-means for said wheels, steering-mechanism operated by said controlling-means and including means for swinging all of said wheels in the same direction and for swinging the front pair of wheels oppositely to the rear pair, and means operated by said controlling-means for causing the wheels at one side to be driven at a different speed with respect to the wheels at the other when the wheels are swung oppositely.

6. In a motor-vehicle, the combination of a pair of front and a pair of rear dirigible traction-wheels, variable speed driving-mechanism for driving all of said wheels, controlling-means for said wheels, steering-mechanism operated by said controlling-means and including means for swinging all of said wheels in the same direction and for swinging the front pair of wheels oppositely to the rear pair, and means operated by said controlling-means for causing the wheels at one side to be driven at a different speed with respect to the wheels at the other when the wheels are swung oppositely.

7. In a motor-vehicle, the combination of a pair of front and a pair of rear dirigible wheels, a unitary controlling device for steering the vehicle, and constant connections between said device and all of said wheels including means whereby all of the wheels may be conjointly swung in the same direction, and means whereby one pair of wheels may be swung differentially with respect to the other pair.

8. In a motor-vehicle, the combination of a pair of front and a pair of rear dirigible-wheels, mechanism for driving a pair of said wheels, a unitary steering-device and constant connections between said device and all of the wheels including means whereby all of the wheels may be conjointly swung in the same direction, and means whereby one pair of wheels may be swung differentially with respect to the other pair.

9. In a motor-vehicle, the combination of a pair of front and a pair of rear dirigible wheels, variable speed driving mechanism for driving a pair of said wheels, a unitary steering-device and constant connections between said device and all of the wheels including means whereby all of the wheels may be conjointly swung in the same direction and means whereby one pair of wheels may be swung differentially with respect to the other pair.

10. In a motor-vehicle, the combination of a pair of front and a pair of rear dirigible wheels, variable speed mechanism for driving all of said wheels, a unitary steering-device and constant connections between said device and all of the wheels including means whereby all of the wheels may be conjointly swung in the same direction, and means whereby one pair of wheels may be swung differentially with respect to the other pair.

11. In a motor-vehicle, the combination of a pair of front and a pair of rear dirigible traction-wheels, driving mechanism for a pair of said wheels and a revoluble pivotally sustained steering-shaft and connections whereby the wheels will be differentially operated when the shaft is rotated and the shaft is tilted about its pivotal support respectively.

12. In a motor-vehicle, the combination of a pair of front and a pair of rear dirigible traction-wheels, a revoluble pivotally sustained steering-shaft and means whereby all of the wheels will be swung in one direction, when the shaft is tilted and whereby the wheels will be differentially swung when the shaft is rotated.

13. In a motor-vehicle, the combination of a pair of front and a pair of rear dirigible traction-wheels, variable-speed driving mechanism for a pair of said wheels and a revoluble pivotally sustained steering-shaft and connections whereby the wheels will be differentially operated when the shaft is rotated and tilted about its pivotal support respectively.

14. In a motor-vehicle, the combination of a pair of front and a pair of rear dirigible traction-wheels, variable speed driving mechanism for a pair of said wheels, a revoluble pivotally sustained steering-shaft and means whereby all of the wheels will be swung in one direction, when the shaft is tilted and whereby the wheels will be differentially swung when the shaft is rotated.

15. In a motor-vehicle, the combination of a pair of front and a pair of rear dirigible traction-wheels, variable speed mechanism, for driving a pair of said wheels, a revoluble pivotally sustained steering-shaft, means whereby the steering-wheels will be swung differentially when the shaft is turned and when the shaft is tilted respectively and a speed changing device also operatively connected to said shaft.

STEPHEN B. GRAY.

Witnesses:
J. W. ELLIOTT, Jr.,
J. ALLERTON PALMER.